United States Patent
Brosius et al.

(10) Patent No.: US 7,549,679 B2
(45) Date of Patent: Jun. 23, 2009

(54) PIPE FITTING WITH COMPRESSION OF SEAL STRUCTURE

(75) Inventors: Edward Brosius, Taylor, MI (US); Brian D. Sanzone, Commerce Township, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 273 days.

(21) Appl. No.: 11/517,624

(22) Filed: Sep. 8, 2006

(65) Prior Publication Data

US 2008/0061550 A1    Mar. 13, 2008

(51) Int. Cl.
*F16L 21/02* (2006.01)
(52) U.S. Cl. .................. 285/340; 285/248; 285/354
(58) Field of Classification Search ............. 285/249, 285/248, 247, 354, 386, 343, 340
See application file for complete search history.

(56) References Cited

U.S. PATENT DOCUMENTS

| | | | |
|---|---|---|---|
| 1,440,207 A * | 12/1922 | Burns ................ 285/340 |
| 2,316,806 A | 4/1943 | Parker |
| 2,333,470 A | 11/1943 | Cowles |
| 2,351,363 A | 6/1944 | Parker et al. |
| 2,393,252 A | 1/1946 | Kaysing |
| 2,437,632 A | 3/1948 | Wolfram |
| 2,452,277 A | 10/1948 | Woodling |
| 2,452,278 A | 10/1948 | Woodling |
| 2,459,608 A * | 1/1949 | Wolfram ............ 285/340 |
| 2,466,526 A | 4/1949 | Wolfram |
| 2,466,527 A | 4/1949 | Wolfram |
| 2,469,851 A | 5/1949 | Stecher et al. |
| 2,478,149 A * | 8/1949 | Wolfram et al. ...... 285/342 |
| 2,511,134 A | 6/1950 | Stranberg |
| 2,513,115 A * | 6/1950 | Sprigg ............... 285/249 |
| 2,644,700 A | 7/1953 | Woodling |
| 2,693,374 A | 11/1954 | Wurzburger |
| 2,912,262 A | 11/1959 | Franck |
| 2,995,388 A * | 8/1961 | Morello, Jr. et al. ... 285/340 |
| 2,999,701 A * | 9/1961 | Blair et al. ......... 285/340 |
| 3,025,804 A | 3/1962 | Franck |
| 3,074,747 A | 1/1963 | Boughton |
| 3,365,219 A * | 1/1968 | Nicolaus ........... 285/340 |
| 3,441,297 A | 4/1969 | Koski |
| 3,545,794 A * | 12/1970 | Wise et al. ......... 285/248 |
| 3,563,575 A | 2/1971 | Sanford |
| 3,591,208 A | 7/1971 | Nicolaus |
| 3,635,502 A * | 1/1972 | Burkhalter, Jr. ..... 285/148.26 |
| 3,684,322 A | 8/1972 | Kotsakis |

(Continued)

*Primary Examiner*—David E Bochna
(74) *Attorney, Agent, or Firm*—Edgar A. Zarins; Nirav D. Parikh

(57) ABSTRACT

A fitting to be secured on pipes can be used with a number of distinct pipe materials and types. The fitting includes a nut receiving a Belleville spring washer. As the nut is tightened on threads on an end fitting, it forces the Belleville spring washer away from a relaxed position. This causes a radially inner portion of said spring washer to dig into an outer surface of the pipe, locking the Belleville spring washer, and hence the nut, on the pipe. The deformation of the washer also forces a ring against an inner seal, deforming the seal against the pipe, the nut, and the end fitting. In a second embodiment, a second washer is also deformed. The present invention provides a simple and universal method of attaching pipes to end fittings.

13 Claims, 3 Drawing Sheets

U.S. PATENT DOCUMENTS

| | | |
|---|---|---|
| 3,695,640 A | 10/1972 | Clague |
| 3,898,163 A * | 8/1975 | Mott .......................... 210/246 |
| 3,986,730 A * | 10/1976 | Martelli et al. ................ 285/23 |
| 3,989,283 A | 11/1976 | Pepper |
| 4,037,864 A | 7/1977 | Anderson et al. |
| 4,136,897 A | 1/1979 | Haluch |
| 4,529,231 A | 7/1985 | Greenawalt |
| 4,635,975 A | 1/1987 | Campbell |
| 4,777,669 A * | 10/1988 | Rogus ........................... 4/696 |
| 4,801,158 A * | 1/1989 | Gomi .......................... 285/52 |
| 4,878,697 A | 11/1989 | Henry |
| 5,121,949 A | 6/1992 | Reese |
| 5,217,261 A | 6/1993 | DeWitt et al. |
| 5,593,186 A | 1/1997 | Harris |
| 5,695,226 A * | 12/1997 | Gouda ........................ 285/340 |
| 5,730,476 A * | 3/1998 | Gouda ........................ 285/340 |
| 5,845,946 A * | 12/1998 | Thomas ..................... 285/348 |
| 5,954,375 A | 9/1999 | Trickle et al. |
| 6,702,336 B1 | 3/2004 | Chelchowski et al. |
| 2004/0032125 A1 | 2/2004 | Rehder et al. |

* cited by examiner

PIPE FITTING WITH COMPRESSION OF SEAL STRUCTURE

BACKGROUND OF THE INVENTION

The application relates to a pipe fitting wherein a nut carries a spring washer, and the spring washer drives an intermediate member to in turn compress a seal to seal against both components of the pipe fitting.

Pipe fittings are utilized to connect pipes to end fittings, such as plumbing fittings. There are several types of pipe materials and types that are commonly utilized in modern fluid-handling systems such as plumbing. In general, each of these distinct pipe types have required distinct fittings.

Generally, the fittings in the prior art include a nut that carries a spring washer of some sort to lock the nut to an underlying pipe. The fitting is then threaded onto mating threads on an end fitting. One deficiency with these structures is that distinct pipe fittings are required for each of the several pipe types. It would be desirable to have a more universal fitting such that fewer components are necessary to connect any number of pipe types.

SUMMARY OF THE INVENTION

In a disclosed embodiment of this invention, a common pipe fitting can be utilized with several distinct pipe types. The pipe fitting includes a nut having a thread at one end, and a shoulder at the other. A spring washer, which is disclosed as a Belleville-type washer sits against the shoulder. A second ring sits inward of the spring washer. The ring abuts a seal. The seal is disclosed as being formed of an appropriate resilient material, and may be formed of EPDM. When the nut is tightened onto threads on a mating fitting, the spring washer is deformed against the inner ring. As it deforms, an inner portion of the spring washer digs into the outer surface of the pipe, locking the fitting to the pipe. Further, this movement of the spring washer forces the inner ring against the seal. The seal is deformed radially inwardly against a radially outer surface of the pipe, and also against surfaces of the nut, and the fitting. In this manner, a simple fitting is capable of providing a sealed connection on any number of pipes.

In a second embodiment, an inner ring washer formed of PET in a disclosed embodiment, provides a seal against the end of the threads on the fitting, and further assists in compression of the main seal.

These and other features of the present invention can be best understood from the following specification and drawings, the following of which is a brief description.

DETAILED DESCRIPTION OF THE PREFERRED EMBODIMENT

Figure 1:
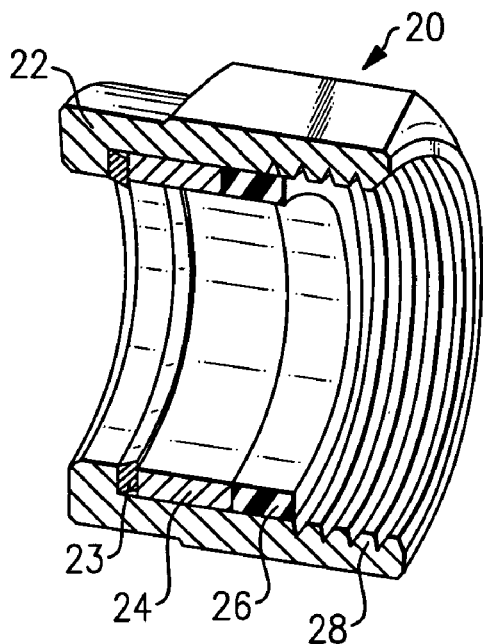
FIG. 1 is an exploded view of the first embodiment fitting.

A fluid fitting 20 is illustrated in FIG. 1 having a nut 22 receiving a Belleville-type spring washer 23, an inner ring 24, and an inner seal 26. As shown, threads 28 are formed on the nut 22. Ring 24 is preferably formed of brass, although other materials may be utilized.

Figure 2A:
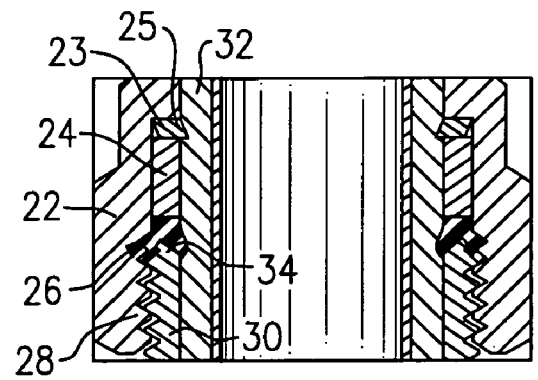
FIG. 2A shows the fitting of FIG. 1 on a first type pipe.

As shown in FIG. 2A, when the nut 22 is tightened on threads on an end fitting 30, the Belleville-type spring washer is deformed from a relaxed position such that a radially inner portion 25 digs into an outer surface of a pipe 32. At the same time, the Belleville-type spring washer is forced against the ring 24 during this deformation. The ring 24 thus compresses the seal 26 both radially outwardly against an inner surface of the nut 22, against a radially outer surface of the pipe 32, and against the end fitting 30 at its axially outermost end 34.

Figure 2B:
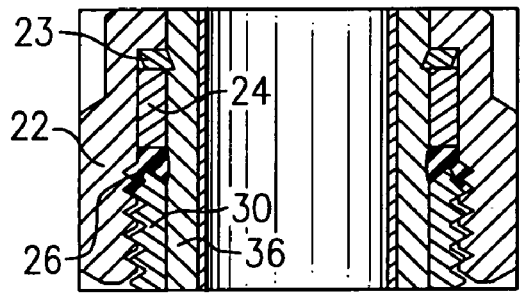
FIG. 2B shows the fitting of FIG. 1 on a second type pipe.
Figure 2C:
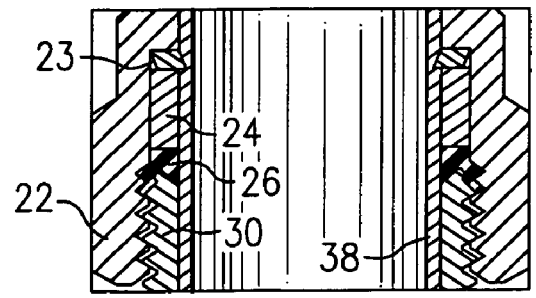
FIG. 2C shows the fitting of FIG. 1 on a third type pipe.

As shown in FIG. 2B and FIG. 2C, this same fitting can be used with distinct pipe types 36 and 38. Simply, the present invention discloses a simple and uniform type fitting that can be easily attached onto a pipe, and used to secure that pipe to an end fitting. The pipe is merely moved within the nut, and the nut is then tightened on the end fitting. The Belleville-type washer will deform to lock the Belleville-type washer, and hence the nut onto the pipe, and the Belleville-type washer will also force the ring 24 to deform the seal 26.

Figure 3:
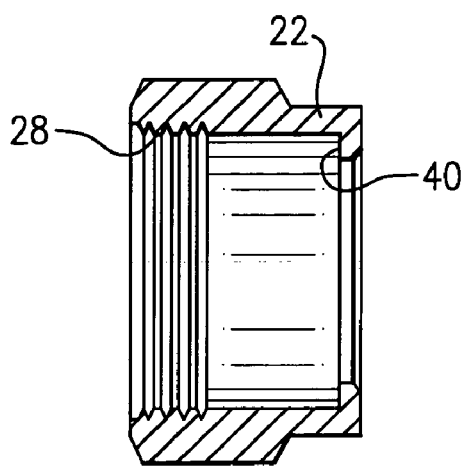
FIG. 3 is a cross-sectional view through a nut according to the present invention.

FIG. 3 is a cross-sectional view of the nut 22 showing an end shoulder or ledge 40 for carrying the Belleville-type washer as it is tightened.

Figure 4:
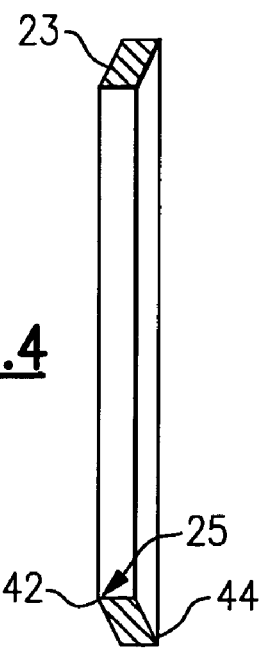
FIG. 4 is a cross-sectional view through a Belleville-type spring washer according to the present invention.
Figure 5:
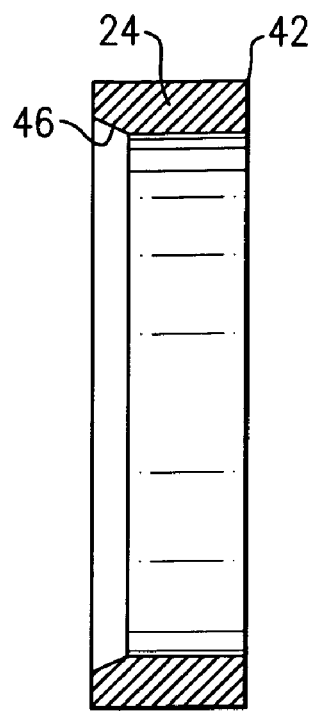
FIG. 5 is a cross-sectional view through a brass ring according to the present invention.

FIG. 4 is a cross-sectional view of the Belleville-type washer 23 in its relaxed state. As can be recognized, when the nut 22 is tightened, it abuts surface 44, and forces it to the right as shown in FIG. 4. This forces the inner surface 25 radially inwardly to lock on a pipe. Further, the inner side 44 of the Belleville-type washer 23 will abut the ring 24. As shown in FIG. 5, the ring 24 has a notch 46 optionally at a radially inner surface. Notch 46 will face the Belleville-type washer 42 or optionally the seal 26.

FIG. 4 does not show the shape of a classic Belleville spring washer. A classic Belleville spring washer shape can be contrasted to the disclosed Belleville-type washer utilized in the preferred embodiment of this application. Of course, the invention would broadly cover any type spring washer, including a classic Belleville spring washer.

Figure 6:
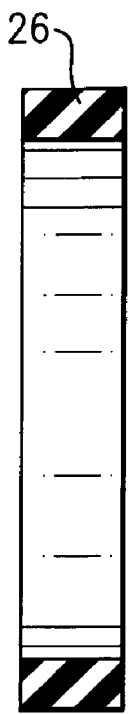
FIG. 6 is a cross-sectional view of an inner seal according to the present invention.

FIG. 6 shows the seal 26 in its undeformed state. As can be appreciated, by being formed of a resilient material, seal 26 can conform to the shape required for the specific application.

Figure 7A:
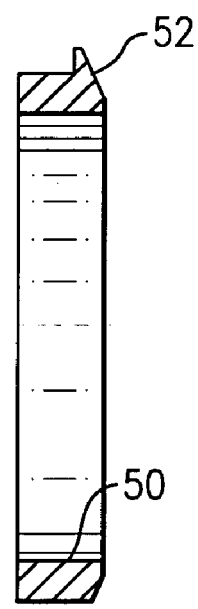
FIG. 7A is a cross-sectional view of a second sealing washer utilized in a second embodiment of the present invention.

FIG. 7A shows a component of another embodiment wherein a second washer 50 formed of PET or other suitable rigid polymers, is positioned inwardly of the seal 26. The second washer is deformed when the deformation of the first seal 26 occurs. The second washer essentially seals against the end 34 of the fitting 30. It also assists in controlling the compression and deformation of the seal 26, and constrains the elastomeric seal 26 to the smooth cylindrical portion of nut 22.

Figure 7B:
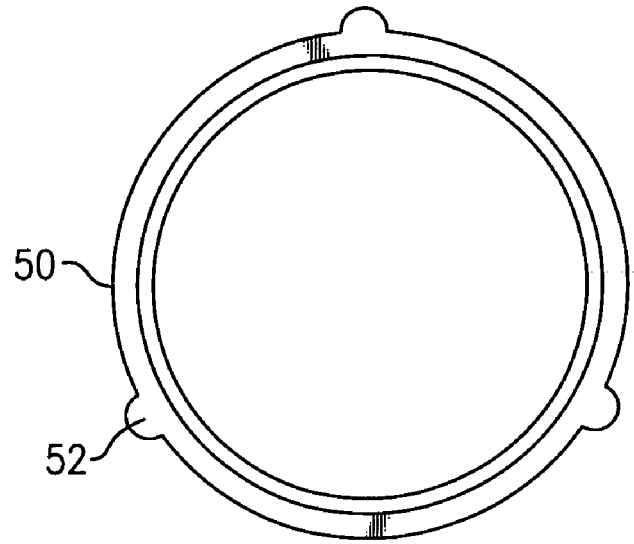
FIG. 7B is an end view of the FIG. 7A component.

FIG. 7B is an end view of the washer 50. As can be appreciated, the washer 50 has three spaced tabs 52. Tabs 52 lock the washer 50 within the nut 22 prior to the nut 22 being secured to the fitting. The washer 50 thus holds all of the other components within the nut 22 prior to attachment.

Figure 8A:
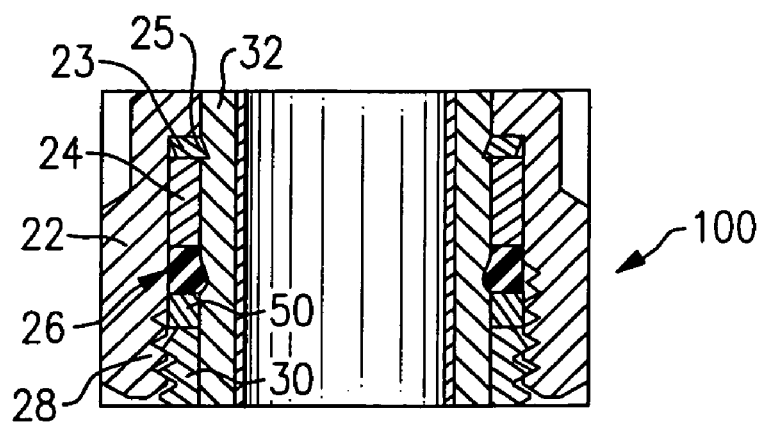
FIGS. 8A-8C are first cross-sectional views similar to the FIGS. 2A-2C, and disclosing the second embodiment in an assembled state.
Figure 8B:
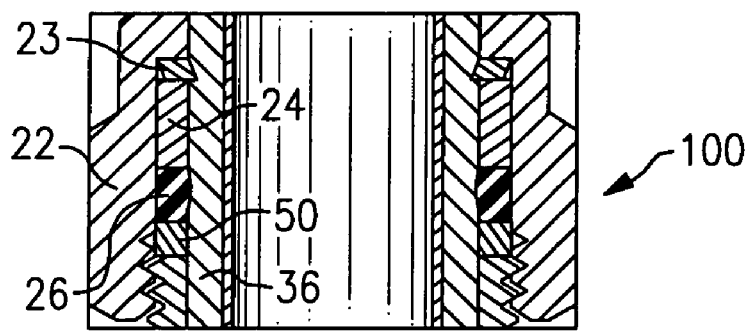
Figure 8C:
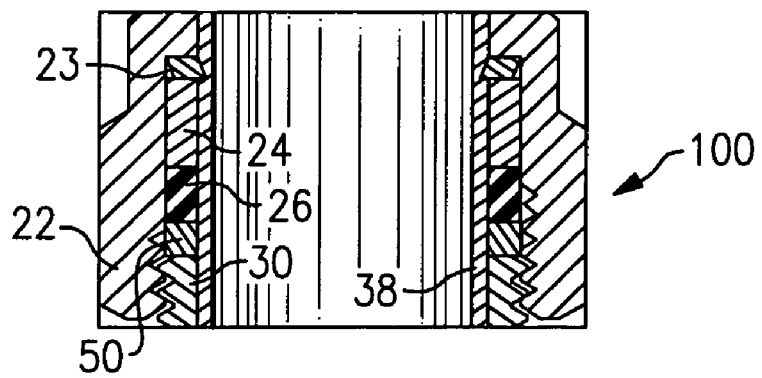

FIGS. 8A-8C show an assembly view 100 including this washer 50. The system operates to be secured to various pipe types in a manner similar to the FIG. 2A-2C embodiments.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A fitting for a pipe comprising:
   a nut having a thread at an inner end and a ledge at an outer end;
   a spring washer positioned within said nut;
   a ring positioned on an opposed side of said spring washer from said ledge, and within said nut;
   a seal positioned on an opposed side of said ring from said spring washer, and said nut having threads extending beyond said seal, such that said nut can be tightened onto threads on a connection, and when said nut is tightened onto the connection, said spring washer being deformed to lock onto a pipe received within said nut, and said spring washer forcing said ring against said seal to deform said seal;
   a second washer positioned on an opposed side of said seal from said ring, with said second washer in contact with said seal, and said second washer having structure to lock said second washer within said nut and hold the spring washer, the ring and the seal within said nut, and said spring washer being a Belleville-type washer; and
   said second washer has circumferentially spaced tabs to lock said second washer within said nut.

2. The fitting as set forth in claim 1, wherein said second washer is formed of PET and said seal is formed of EPDM.

3. The fitting as set forth in claim 1, wherein a plurality of distinct pipes can be secured by said fitting.

4. The fitting as set forth in claim 1, wherein said ring is formed of brass.

5. The fitting as set forth in claim 1, wherein the fitting provides a universal fitting that can be utilized with a plurality of distinct pipe types.

6. The fitting as set forth in claim 1, wherein said ring has a generally rectangular cross-section with a notch at an inner-peripheral surface at one end.

7. A pipe connection comprising:
   a pipe received with a bore in a nut;
   said nut having a thread at an inner end and a ledge at an outer end, a spring washer positioned within said nut, a ring positioned on an opposed side of said spring washer from said ledge, and within said nut, and a seal positioned on an opposed side of said ring from said spring washer, and said nut having threads extending beyond said seal;
   an end fitting having threads and said nut tightened onto said threads on said end fitting, and when said nut being tightened, said spring washer being deformed to lock onto said pipe, and said spring washer forcing said ring against said seal to deform said seal against said pipe and said end fitting;
   a second washer positioned on an opposed side of said seal from said ring, with said second washer in contact with said seal, and said second washer having structure to lock said second washer within said nut and hold the spring washer, the ring and the seal within said nut, and said spring washer being a Belleville-type washer; and
   said second washer has circumferentially spaced tabs to lock said second washer within said nut.

8. The pipe connection as set forth in claim 7, wherein said second washer is formed of PET and said seal is formed of EPDM.

9. The pipe connection as set forth in claim 7, wherein a plurality of distinct pipes can be secured by said fitting.

10. The pipe connection as set forth in claim 7, wherein said ring is formed of brass.

11. The pipe connection as set forth in claim 7, wherein said spring washer is a Belleville-type washer.

12. The pipe connection as set forth in claim 7, wherein the fitting provides a universal fitting that can be utilized with a plurality of distinct pipe types.

13. The pipe connection as set forth in claim 7, wherein said ring has a generally rectangular cross-section with a notch at an inner-peripheral surface at one end.

* * * * *